United States Patent
Abe et al.

(10) Patent No.: US 10,358,582 B2
(45) Date of Patent: Jul. 23, 2019

(54) MARKING FILM

(75) Inventors: Hidetoshi Abe, Tendo (JP); Yorinobu Takamatsu, Sagamihara (JP); Ronald S. Steelman, Woodbury, MN (US); Naoyuki Toriumi, Sagamihara (JP); Michael P. Daniels, Inver Grove Heights, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 88 days.

(21) Appl. No.: 13/521,903

(22) PCT Filed: Jan. 12, 2011

(86) PCT No.: PCT/US2011/020957
§ 371 (c)(1),
(2), (4) Date: Sep. 20, 2012

(87) PCT Pub. No.: WO2011/088096
PCT Pub. Date: Jul. 21, 2011

(65) Prior Publication Data
US 2013/0004766 A1   Jan. 3, 2013

Related U.S. Application Data

(60) Provisional application No. 61/295,456, filed on Jan. 15, 2010.

(51) Int. Cl.
*C09J 7/24* (2018.01)
*C08L 33/14* (2006.01)
*C08L 33/26* (2006.01)
*C08K 5/3412* (2006.01)

(52) U.S. Cl.
CPC .......... *C09J 7/24* (2018.01); *C08L 33/14* (2013.01); *C08L 33/26* (2013.01); *C08K 5/3412* (2013.01); *C08L 2205/025* (2013.01); *C09J 2201/622* (2013.01); *C09J 2433/00* (2013.01); *C09J 2433/006* (2013.01); *Y10T 428/28* (2015.01)

(58) Field of Classification Search
None
See application file for complete search history.

(56) References Cited

U.S. PATENT DOCUMENTS

| | | |
|---|---|---|
| 6,288,174 B1 | 9/2001 | Ikegami |
| 6,447,899 B1 | 9/2002 | Dutton |
| 6,919,405 B2 | 7/2005 | Kinning |
| 2004/0241484 A1 | 2/2004 | Uchida |
| 2004/0202879 A1* | 10/2004 | Xia et al. ............... 428/500 |
| 2006/0234076 A1* | 10/2006 | Takamatsu et al. ..... 428/522 |
| 2009/0029160 A1 | 10/2009 | Takamatsu |
| 2010/0055418 A1 | 3/2010 | Takamatsu et al. |
| 2010/0272942 A1 | 10/2010 | Abe |

FOREIGN PATENT DOCUMENTS

| | | |
|---|---|---|
| JP | H9-087601 | 3/1997 |
| JP | 2562157 | 10/1997 |
| JP | 2001-089731 | 4/2001 |
| JP | 2006-241270 | 9/2006 |
| JP | 2007-186577 | 7/2007 |
| JP | 2007-210240 | 8/2007 |
| JP | 2008-55690 | 3/2008 |
| WO | WO 2004/094549 | 11/2004 |
| WO | WO 2005/023913 | 3/2005 |

* cited by examiner

*Primary Examiner* — Callie E Shosho
*Assistant Examiner* — Daniel D Lowrey
(74) *Attorney, Agent, or Firm* — Daniel J. Iden

(57) ABSTRACT

The present application is directed to an acrylic polymer. Specifically, a marking film comprising a film layer which comprises a polymer blend of a first (meth)acrylic polymer having a glass transition temperature of 30 degrees C. to 180 degrees C. and a second (meth)acrylic polymer having a glass transition temperature of over −80 degrees C. less than 30 degrees C. One from the first and second (meth)acrylic polymers comprises a carboxylic group and another comprises an amide group. The marking film additionally comprises an adhesive layer.

13 Claims, No Drawings

MARKING FILM

CROSS REFERENCE TO RELATED APPLICATIONS

This application is a national stage filing under 35 U.S.C. 371 of PCT/US2011/020957, filed Jan. 12, 2011, which claims priority to U.S. Provisional Patent Application No. 61/295,456, filed Jan. 15, 2010, the disclosure of which is incorporated by reference in its/their entirety herein.

FIELD

The present invention relates to an acrylic or methacrylic film (hereinafter referred to as a (meth)acrylic film). The film of the present invention can be used as a base material of an adhesive coated product in interior and exterior materials for buildings, facing materials for furniture, and interior and exterior materials for vehicles, and is also useful as a substitute for a polyvinyl chloride based film because it is free from halogen.

BACKGROUND

Acrylic films are known. For example, a decorative sheet comprising a base film made of an acrylic resin and a protective layer made of an acrylic resin laminated on the surface of the base film and decorative sheet comprising a base film made of an olefinic resin and a protective layer made of an acrylic resin laminated on the surface of the base film have been disclosed.

In case the acrylic resin is formed into a film, the resulting film is generally not fit for use as a decorative sheet because it is rigid and brittle. To improve brittleness of the acrylic resin and to impart flexibility to the acrylic resin, the acrylic polymers have been modified or additives have been added to the acrylic resin.

SUMMARY

The present application is directed to an acrylic polymer. Specifically, a marking film comprising a film layer which comprises a polymer blend of a first (meth)acrylic polymer having a glass transition temperature of 30 degrees C. to 180 degrees C. and a second (meth)acrylic polymer having a glass transition temperature of greater than −80 degrees C. less than 30 degrees C. One of the first and second (meth) acrylic polymers comprises a carboxylic group and the other comprises an amide group. The marking film additionally comprises an adhesive layer.

DETAILED DESCRIPTION

The (meth)acrylic film of the present invention is formed of a blend of a first (meth)acrylic polymer having a glass transition temperature of between about 30° C. and 180° C. and a second (meth)acrylic polymer having a glass transition temperature of over −80° C. and less than 30° C. One of the first or second (meth)acrylic polymers comprise a carboxylic group and the other (meth)acrylic polymer comprises an amide group. The term "(meth)acryl" as used herein means an acryl or methacryl. The film is then made into a marking film with the addition of an adhesive layer.

Examples of the carboxylic group include, for example, acrylic acid, methacrylic acid, beta-carboxyethylacrylate, 2-(meth)acryloyloxyethyl succinic acid, 2-(meth)acryloyloxyethylphthalate, 2-(meth)acryloyloxyethyl hexahydrophthalate and omega-carboxypolycaprolactone mono (meth)acrylate.

Examples of the amide group include, for example, N,N-dimethyl(meth)acrylamide, N,N-diethyl(meth)acrylamide, N-isopropyl(meth)acrylamide, N-octyl(meth)acrylamide, hydroxyethyl(meth)acrylamide and diacetone(meth)acrylamide.

The first (meth)acrylic polymer is present in the blend at about 10 to about 90 parts by weight. The second (meth) acrylic polymer is present in the blend at about 10 to about 90 parts by weight. One of the polymers comprises a carboxylic group in about 4 to about 20 mole % of the polymer. The other polymer then comprises an amide in about 5 to 15 mol % of the polymer. In another embodiment, the first polymer comprises a carboxylic group in about 5 to about 15 mole % of the polymer. The other polymer then comprises an amide in about 10 to 40 mol % of the polymer The glass transition temperature (Tg) of the (meth)acrylic polymers were determined using the FOX equation (as follows):

$$1/Tg = X1/(Tg1+273.15) + X2/(Tg2+273.15) + \ldots + Xn/(Tgn+273.15)$$

where Tg1 denotes a glass transition point of a homopolymer of component 1, Tg2 denotes a glass transition point of a homopolymer of component 2, X1 denotes the weight fraction of component 1 as determined by the amount of added monomer during the polymerization, X2 denotes the weight fraction of component 2 as determined by the amount of added monomer during the polymerization, and X1+X2+ . . . +Xn=1, on the assumption that the respective polymers are copolymerized from n kinds of monomers.

Examples of the (meth)acrylic polymer having a glass transition temperature of between about 30° C. and 160° C. include copolymers of methyl methacrylate/butyl methacrylate/methacrylic acid, methyl methacrylate/cyclohexyl methacrylate/methacrylic acid, methyl methacrylate/2-ethylhexyl methacrylate/methacrylic acid and methyl methacrylate/butyl methacrylate/N,N-dimethyl acrylamide.

Examples of the (meth)acrylic polymer having a glass transition temperature of between −80° C. and 30° C. include copolymers of butyl acrylate/N,N-dimethyl acrylamide, butyl acrylate/diacetoneacrylamide, 2-ethyl hexylacrylate/N,N-dimethyl acrylamide, butyl acrylate/N-isopropyl acrylamide.

A (meth)acrylic film of the present invention can be formed by a conventional film forming method. Specifically, the film can be formed by mixing solutions of these polymers, applying the mixed solution on the release surface of a liner, and solidifying the solution with drying. As a coating device conventional coaters such as bar coater, knife coater, roll coater, and die coater, can be used. This film can be formed by a melt extrusion method. The solidifying operation is the same as the operation of cooling the molten resin component.

A film having a desired tensile strength and elongation characteristics can be obtained by changing the mixing ratio of the polymers. For example, a mixing ratio of a polymer having the higher Tg to the polymer having the lower Tg is generally preferably within a range from 10:90 to 90:10, more preferably from 20:80 to 90:10, and most preferably from 30:70 to 90:10. It is preferable to have a higher amount of polymer having the higher Tg.

Furthermore, tensile strength and elongation characteristics can be freely adjusted by adding a polyfunctional (meth)acrylate monomer or oligomer. This polyfunctional (meth)acrylate monomer or oligomer can be incorporated into the polymer by irradiation with ultraviolet light. Examples of the polyfunctional (meth)acrylate monomer or oligomer include di(meth)acrylates such as hexanediol di(meth)acrylate; polyalkylene glycol di(meth)acrylates such as polyethylene glycol di(meth)acrylate; polyfunctional (meth)acrylates such as di(meth)acrylate-modified bisphenol A, hydroxypivalic acid neopentyl glycol di(meth)acrylate, trimethylolpropane tri(meth)acrylate, pentaerythritol poly(meth)acrylate and dipentaerythritol poly(meth)acrylate; and epoxy(meth)acrylates and urethane (meth)acrylates, such as (meth)acrylic acid adduct of ethylene glycol diglycidyl ether and (meth)acrylic acid adduct of glycerin diglycidyl ether.

The polymers may be crosslinked via a radical generating group in the first aspect, or they are crosslinked by the reaction of a hydroxyl group with a polyisocyanate in the second aspect. By crosslinking them, networks are formed, contributing to improved elongation characteristics at low temperature.

In the (meth)acrylic film of the present invention, the tensile break strength is preferably 3 MPa or more, more preferably 10 MPa or more, and most preferably 20 MPa or more. When the tensile break strength is less than 3 MPa, there arises a problem that the resulting film is likely to be broken when applied on the adherend or the film will stretch and become deformed during the repositioning operation. In the (meth)acrylic film of the present invention, the elongation is preferably 20% or more, more preferably 50% or more, and most preferably 75% or more. When the elongation is less than 20%, there arises a problem that the resulting film is likely to be broken when applied on the adherend. Such elongation values also enhance the ability of the marking film to be applied to curved and three dimensional shaped substrates.

A (meth)acrylic film in a marking film has a front surface and a back surface and receives a colorant on the front surface, for example a toner or ink image. In order to prevent the toner from falling off, a protective film may be provided on the front surface of the film over the colorant. In this case, the toner forms a visible image through the protective film). Also adhesion between the toner and the (meth)acrylic film can be enhanced by providing a receptor layer on the surface of the (meth)acrylic film.

On the back surface of the (meth)acrylic film, an adhesive layer is provided. The adhesive layer usually forms a flat adhesive surface, but it may have an uneven adhesive surface. On the uneven adhesive surface of the adhesive layer, a protruding portion and a recessed portion surrounding the protruding portion are formed and a communicating passage in communication with the outside is defined by the space between the recessed portion of the adhesive surface and the surface of the adherend when the adhesive layer is initially bonded to the adherend. Particles may be provided on the surface of the adhesive to reduce or eliminate adhesion under very light pressure.

The colorant is usually a toner or ink. The toner comprises a binder resin and a pigment dispersed in the binder resin. The binder resin is composed of a mixture of one or more kinds selected from the group consisting of vinyl chloride-vinyl acetate copolymer, an acrylic resin and polyester resin.

The protective film has light transmission properties. A light transmission is usually 60% or more, preferably 70% or more, and particularly preferably 80% or more. The term "light transmission" as used herein means an entire light transmission as measured by a spectrophotometer or, a color meter which also serves as a photometer, using light having a wavelength of 550 nm.

The protective film is preferably made of a resin film containing high transparency. The resin of the resin film includes, for example, fluororesin, phthalate polyester (e.g. PET and PEN), acrylic resin, and petroleum-resistant resin. The fluororesin is a polymer obtained by polymerizing the fluorine monomer. The fluorine monomer includes, for example, fluorine ethylene monomers such as vinylidene fluoride, propylene hexafluorine, ethylene tetrafluoride, and ethylene chloride trifluoride. It is possible to mix one or more kinds of copolymerizable monomers selected from methacrylates such as methyl methacrylate, ethyl methacrylate, propyl methacrylate, and butyl methacrylate; and acrylates such as methyl acrylate, ethyl acrylate, propyl acrylate, and butyl acrylate, in addition to the fluorine monomer. Also a protective film may be made of a resin composition obtained by blending the fluorine resin with the acrylic resin. The thickness of the protective film is usually within a range from 5 to 120 µm, and preferably from 10 to 100 µm.

An adhesive layer for the protective film is usually used to bond the protective film to the (meth)acrylic film. The adhesive of the adhesive layer for protective film is not specifically limited, but is usually a pressure-sensitive adhesive. The pressure-sensitive adhesive satisfactorily conforms to the unevenness formed by the colorant or toner on the surface of the (meth)acrylic film, thereby making it possible to make the protective film and the (meth)acrylic film come closely into contact with each other without leaving bubbles therebetween, as bubbles may impair visibility. The thickness of the adhesive layer for protective film is usually within a range from 15 to 100 µm, and preferably from 25 to 80 µm.

The resin constituting the receptor layer is not specifically limited and there can use an acrylic polymer, polyolefin, polyvinyl acetate, phenoxy resin or other similar materials showing receptor properties. The glass transition temperature of the resin constituting the receptor layer is usually within a range from 0 to 100° C. When the glass transition temperature of the receptor layer is too high, the toner transferrability is lowered and a clear image may not be obtained. Furthermore, when the glass transition temperature of the receptor layer is too high, the flexibility of the entire marking film may be lowered. The glass transition temperature of the receptor layer is preferably adjusted to 0° C. or higher in order to effectively lower tack at normal temperature of the surface of receiving the colorant. Consequently, it is made possible to effectively prevent sticking of marking film precursors and receptor sheets before applying the protective film. Therefore, after stored in the form of a roll, the roll can be used easily while unwinding. The thickness of the receptor layer is usually within a range from 2 to 50 µm, and preferably from 5 to 40 µm.

The adhesive of the adhesive layer is not specifically limited and is usually a pressure-sensitive adhesive. As the pressure-sensitive adhesive layer, for example, a single-layered pressure-sensitive adhesive film or a double-coated adhesive sheet comprising two pressure-sensitive layers are preferably used.

The adhesive layer can be made by coating a film of an adhesive containing an adhesive polymer. Preferably, the adhesive comprises an adhesive polymer and a crosslinking agent. The term "adhesive polymer" used herein refers to a polymer which exhibits adhesion at normal temperature (about 25° C.). The adhesive polymer may be, for example, acrylic polymer, polyurethane, polyolefin and polyester can be used.

When using a crosslinking agent in case of crosslinking the adhesive polymer, the amount of the crosslinking agent varies depending on the crosslinking agent used, but is usually within a range from 0.02 to 2 parts by weight, and preferably from 0.03 to 1 parts by weight, based on 100 parts by weight of the adhesive polymer.

The glass transition temperature (Tg) of the adhesive layer is preferably within a range from −50 to 0° C., and more preferably from −45 to −5° C. When the Tg of the adhesive layer is too high, bond formation between the film and the adherend may be difficult at cooler temperatures. On the other hand, when Tg of the adhesive layer is too low, when the marking film is stored in the form of a roll, the adhesive oozes from the side portion of the roll and sticking of mutually contacted marking films may occur. Tg is a value determined from Tan delta as measured by using a dynamic viscoelasticity measuring device (Rheometrics Scientific Inc. RDA-II). The measurement may be carried out under the conditions of a shear rate of 1 radian/see (torsion mode), a heating range from −60 to 100° C. and a heating rate of 5° C./sec. The thickness of the specimen is usually from 1 to 2 mm.

The thickness of the adhesive film is usually within a range from 5 to 100 μm, preferably from 20 to 80 μm, and more preferably from 25 to 50 μm. As far as the effect of the present invention is not impaired, there can be added additives such as tackifiers, elastic microspheres, adhesive polymer microspheres, crystalline polymers, inorganic powders, and ultraviolet absorbers.

The adhesive layer usually has a flat adhesive surface, but may have an uneven adhesive surface or a structured surface.

A marking film can be produced in the following manner. First, the above-mentioned (meth)acrylic film is prepared. In case the marking film includes a receptor layer, the receptor layer is formed on the liner and the (meth)acrylic film is then formed on the receptor layer with the liner. In this case, as far as the effect of the present invention is not impaired, the other layer, for example, a primer layer or an adhesive layer may be provided between the (meth)acrylic film and the receptor layer.

An adhesive layer is made to come closely into contact with the back surface of the (meth)acrylic film. A coating solution containing an adhesive is applied on the release surface of the liner and dried to form an adhesive layer with the liner, and then the adhesive layer with the liner is laminated on the back surface of the (meth)acrylic film, thereby making the adhesive layer come closely into contact with the back surface of the (meth)acrylic film.

An image is formed on the surface of the (meth)acrylic film and a protective film is optionally provided thereon, thereby making it possible to complete the marking film.

The thickness of the marking film is usually within a range from 30 to 200 μm, for example from 50 to 100 μm. When the thickness is too small, the mechanical strength decreases and the marking film is likely to be broken when peeled again after bonding to the adherend. On the other hand, when the thickness is too large, the flexibility of the marking film is likely to be lowered.

EXAMPLES

These examples are merely for illustrative purposes only and are not meant to be limiting on the scope of the appended claims. All parts, percentages, ratios, etc. in the examples and the rest of the specification are by weight, unless noted otherwise.

Materials

MMA Methyl Methacrylate; Acryester™ M, Mitsubishi Rayon Company, Limited, Japan.

BMA n-Butyl Methacrylate; Acryester™ NB, Mitsubishi Rayon Company, Limited, Japan.

EHMA 2-Ethylhexyl Methacrylate Acryester™ EH, Mitsubishi Rayon Company, Limited, Japan.

MA Methyl Acrylate; Wako Pure Chemical Industries, Limited, Japan.

CHA Cyclohexyl Acrylate; Viscoat™ #155, Osaka Organic Chemical Industry, Limited, Japan.

BA n-Butyl Acrylate; Mitsubishi Chemical Corporation, Japan.

EA Ethyl Acrylate; Wako Pure Chemical Industries, Limited, Japan.

2-MTA 2-Methoxyethyl Acrylate; (2-MTA, Osaka Organic Chemical Industry, Limited, Japan.

MAA Methacrylic Acid; Mitsubishi Rayon Company, Limited, Japan.

AA Acrylic Acid; Toagosei Company, Limited, Japan.

DMAA N,N-Dimethylacrylamide; Kohjin Company, Limited, Japan.

DEAA Diethylacrylamide; Kohjin Company, Limited, Japan.

NIPAM N-Isopropylacrylamide; Kohjin Company, Limited, Japan.

DAAM Diacetoneacrylamide; Nippon Kasei Chemical Company, Limited, Japan.

V-65 Azobis(2,4-dimethylvaleronitrile); Wako Pure Chemical Industries, Limited, Japan.

V-601 Dimethyl-2,2'-azobis(2-methylpropionate); Wako Pure Chemical Industries, Limited, Japan.

EtAc ethyl acetate

MEK methyl-ethyl-ketone

MIBK methyl-isobutyl-ketone

Test Methods

Glass Transition Temperature (Tg)—Method 1: Hard (High Tg) Polymers

A sample of a polymer solution was coated with a Comma Coater onto a 38 micrometer thick release-treated polyester film (Purex™ A-71; Teij in DuPont Films Japan Limited) and dried in an oven at 80° C. for 10 minutes then at 150° C. for 10 minutes. The coating conditions were controlled to provide a dried film thickness of 50 micrometers. A sample of the dried film measuring 15 millimeters (mm) long and 10 mm wide was evaluated for its dynamic viscoelastic properties using a rheological dynamic analyzer (RSA-III; Rheometric Scientific Incorporated) with the following settings: a tension mode of 10.0 Hz, a temperature range of 0° C. to 150° C., and a heating rate of 5.0° C./min. The Tg was defined as the peak value of tan delta (loss modulus E"/storage modulus E').

Glass Transition Temperature (Tg)—Method 2: Soft (Low Tg) Polymers

A sample of a polymer solution was coated with a Comma Coater onto a 38 micrometer thick release-treated polyester film (Purex™ A-71; Teijin DuPont Films Japan Limited) and dried in an oven at 80° C. for 10 minutes. The coating conditions were controlled to provide a dried film thickness of 50 micrometers. The dried polymer film was then laminated to provide a stack having a height of 3.0 mm, and die cut to give a cylindrical sample having a diameter of 8.0 mm. This sample was evaluated for its dynamic viscoelastic properties using a rheological dynamic analyzer (RSA-III;

Rheometric Scientific Incorporated) with the following settings: a compression mode of 10.0 Hz, and a temperature range of −60° C. to 100° C., a heating rate of 5.0° C./min. The Tg was defined as the peak value of tan delta (loss modulus E"/storage modulus E').

Molecular Weight

The weight-average molecular weight (Mw) and the number-average molecular weight (Mn) were measured by gel permeation chromatography (GPC) with a HP-1090 SERIES II instrument (manufactured by Agilent Technologies Japan) equipped with a refractive index type detector using the following parameters: a PL gel MIXED-Bx2 (300 mm×7.5 mm, i.d. 5 mm) column (Styrene-Divinylbenzene copolymer column manufactured by Polymer Laboratories), tetrahydrofuran (THF) solvent, a flow rate of 1.0 mL/min., a sample concentration of 0.1% [w/v], an injection volume of 100 microliters, at room temperature, calibrated against polystrene. The polydispersity index was also calculated.

Tensile Strength and Elongation—Method 1

A solution blend of the hard (high Tg) and soft (low Tg) polymers was coated onto Purex™ A-71 and was dried in an oven at 80° C. for 10 minutes then at 150° C. for 10 minutes. The coating conditions were controlled to provide a dried film thickness of 50 micrometers. The resulting dried film was evaluated for its tensile strength and elongation using TENSILON RTC-1325A tensile tester manufactured by Orientec Inc., Japan according to the methods described in JIS-K-7161 "Plastics—Determination of tensile properties" and JIS-K-7127 "Plastics—Determination of tensile properties—Part 3: Test conditions for films and sheets" and the following parameters: a gauge length of 50.0 mm, a tensile separation rate of 300 mm/min., a sample specimen of Type 2 as described in JIS-K-7127 having a width of 12.0 mm and a thickness of 0.05 mm, and a test temperature of 25° C. The tensile strength at break, in MegaPascals (MPa), was calculated as $T=F/A$, where F was the tensile force (in Newtons) at break and A was the cross-sectional area A (in square millimeters, $mm^2$). The tensile elongation at break, in %, was calculated as $E=[(L1-L0)/L0]\times 100$, where E was the elongation (in %), L1 was the gauge length (in mm) at break and L0 was the initial gauge length (50.0 mm).

Compatibility of Blends of Hard and Soft Polymers

The compatibility of blends of the hard (high Tg) and soft (low Tg) polymers was determined by visual observation. Dried films of the blends, prepared as described in the test method "Tensile Strength and Elongation", which exhibited optical clarity were judged to have acceptable compatibility ("OK"). Those films which appeared hazy, indicating phase separation, were judged unacceptable ("NG").

Inkjet Image Quality

The solvent inkjet image was printed onto the clear ink receptor described in Example 1, using the solvent inkjet printer (XC540, made by Roland DG Corporation, 1-6-4, Shinmiyakoda, Kita-Ward, Hamamatsu-City, Shizuoka-Prefecture, Japan). ECO-SOL MAX inks, which were provided by Roland, were used. The printing conditions were as follows. Six color (Cyan, Magenta, Yellow, Black, Light cyan, Light magenta), Dual mode, High image quality mode (720 dpi and 1440 dpi), Variable dot A. 300% ink density color bar and picture image were printed. Printing speed was about 3 m/hr. Platen temperature was about 40° C. The image quality and color density were judged by visual inspection. The image quality and color density were designated either "Good" or "Poor".

Rework-Ability

A specimen 150 mm long and 70 mm wide was cut. The specimen was applied using a plastic squeegee with the adhesive layer in contact with a melamine painted panel provided by Paltec Company, 3233-1, Ohkami, Hiratsuka-City, Kanagawa-Prefecture, Japan at 23° C. The specimen was then stripped off by hand quickly. When a specimen could remove easily without the film breaking, it was ranked as "Good". When a specimen not be removed because the film broke, it was ranked as "Poor".

Yield Strength, Elongation—Method 2

A specimen was measuring 25 mm wide and 150 mm long was cut. Both yield strength and elongation were measured by using "TENSILON" tensile tester, a jaw separation rate of 300 mm/min. and gauge length of 100 mm, at 20 degree C.

Polymer Preparation and Evaluation

Preparation and Evaluation of Hard (High Tg) Polymer Solutions H1-H6, H8, and H9

The monomers and amounts shown in Table 1: "Preparation of Hard (High Tg) (meth)Acrylic Polymers" were added to 150 parts by weight (pbw) of ethyl acetate, along with 0.6 pbw of V-601 initiator. The mixture was then purged with nitrogen and solution polymerized at 65° C. for 24 hours. The functional group type and content (mole %), glass transition temperature (Tg) (Test Method 1), molecular weights, and polydispersity indices of the resulting polymers were determined and are shown in Table 1 below.

Preparation and Evaluation of Hard (High Tg) Polymer Solution H7

The polymer solution H7 was prepared using the same method as described for H1 with the following modifications. The amount of ethyl acetate used was 255 pbw, 0.2 pbw V-65 initiator was employed, and the reaction conditions were 50° C. for 24 hours. The properties of the resulting polymer are shown in Table 1 below.

Preparation and Evaluation of Soft (Low Tg) Polymer Solutions S1-S7 and S9-S14

The monomers and amounts shown in Table 2: "Preparation of Soft (Low Tg) Acrylic Polymers" were added to a solvent mixture of 163 pbw of ethyl acetate and 70 pbw 2-butanone, along with 0.2 pbw of V-65 initiator. The mixture was then purged with nitrogen and solution polymerized at 50° C. for 24 hours. The functional group type and content (mole %), glass transition temperature (Tg) (Test Method 2), molecular weights, and polydispersity indices of the resulting polymers were determined and are shown in Table 2 below.

Preparation and Evaluation of Soft (LowTg) Polymer Solution S8

The polymer solution S8 was prepared using the same method as described for 51 with the following. Ethyl acetate, 186 pbw, was used as the solvent. The properties of the resulting polymer are shown in Table 2 below.

TABLE 1

Preparation and Evaluation of Hard (High Tg) (meth)Acrylic Polymers

| Hard Polymer | Composition (wt %) | Functional group | Molar ratio of functional group (mole %) | Tg (° C.) | Weight-average molecular weight (Mw/Mn) |
|---|---|---|---|---|---|
| H-1 | MMA/BMA/MAA (40:54:6) | Carboxyl | 8.2 | 102 | $1.6 \times 10^5$ (Mw/Mn = 2.4) |
| H-2 | MMA/BMA/MAA (60:/34:6) | Carboxyl | 7.7 | 110 | $1.5 \times 10^5$ (Mw/Mn = 2.3) |
| H-3 | BMA/MAA (94:6) | Carboxyl | 9.5 | 89 | $1.7 \times 10^5$ (Mw/Mn = 2.5) |
| H-4 | MMA/EHMA/MAA (60:34:6) | Carboxyl | 8.3 | 110 | $1.6 \times 10^5$ (Mw/Mn = 2.4) |
| H-5 | MMA/BMA/MAA (40:56:4) | Carboxyl | 5.5 | 100 | $1.6 \times 10^5$ (Mw/Mn = 2.3) |

TABLE 1-continued

Preparation and Evaluation of Hard (High Tg) (meth)Acrylic Polymers

| Hard Polymer | Composition (wt %) | Functional group | Molar ratio of functional group (mole %) | Tg (° C.) | Weight-average molecular weight (Mw/Mn) |
|---|---|---|---|---|---|
| H-6 | MMA/BMA/MAA (40:50:10) | Carboxyl | 13.4 | 118 | $1.7 \times 10^5$ (Mw/Mn = 2.5) |
| H-7 | MA/CHA/AA (60:34:6) | Carboxyl | 8.4 | 48 | $1.0 \times 10^6$ (Mw/Mn = 4.6) |
| H-8 | MMA/BMA/DMAA (40:45:15) | Amide | 17.4 | 90 | $1.6 \times 10^5$ (Mw/Mn = 2.3) |
| H-9 | MMA/BMA/DMAA (40:35:25) | Amide | 28.1 | 98 | $1.9 \times 10^5$ (Mw/Mn = 2.3) |

TABLE 2

Preparation and Evaluation of Soft (Low Tg) Acrylic Polymers

| Soft Polymer | Composition (wt %) | Functional group | Molar ratio of functional group (mole %) | Tg (° C.) | Weight-average molecular weight (Mw/Mn) |
|---|---|---|---|---|---|
| S-1 | BA/DMAA (95:5) | Amide | 6.4 | −27 | $4.0 \times 10^5$ (Mw/Mn = 3.9) |
| S-2 | BA/DMAA (90:10) | Amide | 12.6 | −21 | $3.9 \times 10^5$ (Mw/Mn = 3.9) |
| S-3 | BA/DMAA (85:15) | Amide | 18.6 | −12 | $3.6 \times 10^5$ (Mw/Mn = 3.8) |
| S-4 | BA/DMAA (80:20) | Amide | 24.4 | −4 | $3.7 \times 10^5$ (Mw/Mn = 4.0) |
| S-5 | BA/DMAA (75:25) | Amide | 30.1 | 1 | $3.5 \times 10^5$ (Mw/Mn = 3.6) |
| S-6 | BA/DMAA (70:30) | Amide | 35.7 | 7 | $3.3 \times 10^5$ (Mw/Mn = 3.7) |
| S-7 | MA/DMAA (85:15) | Amide | 13.3 | 30 | $3.6 \times 10^5$ (Mw/Mn = 3.6) |
| S-8 | EA/DMAA (85:15) | Amide | 14.1 | 11 | $8.4 \times 10^5$ (Mw/Mn = 4.7) |
| S-9 | 2-MTA/DMAA (85:15) | Amide | 18.8 | −8 | $3.4 \times 10^5$ (Mw/Mn = 3.8) |
| S-10 | BA/DAAM (77.5:22.5) | Amide | 18.0 | −8 | $3.6 \times 10^5$ (Mw/Mn = 4.0) |
| S-11 | BA/DAAM (70:30) | Amide | 24.5 | 1 | $3.9 \times 10^5$ (Mw/Mn = 4.1) |
| S-12 | BA/NIPAM (82:18) | Amide | 20.0 | 1 | $4.0 \times 10^5$ (Mw/Mn = 4.0) |
| S-13 | BA/DEAA (82:18) | Amide | 18.1 | −14 | $3.8 \times 10^5$ (Mw/Mn = 3.8) |
| S-14 | BA/AA (94:6) | Carboxyl | 10.8 | −19 | $4.4 \times 10^5$ (Mw/Mn = 3.9) |

Polymer Blends Preparation and Evaluation

Blends of hard (high Tg) and soft (low Tg) polymers were prepared by combining various amounts of the different polymer solutions as indicated in Table 3 below to give the indicated ratio of polymers. The blended solutions were used to prepare dried films and evaluated for tensile strength and elongation (Method 1), and compatibility.

TABLE 3

Preparation and Evaluation of Polymer Blends

| Ex. | Hard (High Tg) Polymer | | | | Soft (Low Tg) Polymer | | | | Polymer Ratio H:S | Compatibility | Tensile Strength (MPa) | Tensile Elongation (%) |
|---|---|---|---|---|---|---|---|---|---|---|---|---|
| | Polymer | Functional Group | Mole % | Tg (° C.) | Polymer | Functional Group | Mole % | Tg (° C.) | | | | |
| CE1 | H-1 | Carboxyl | 8.2 | 102 | S-1 | Amide | 6.4 | −27 | 100:70 | NG | Too brittle, not tested | |
| 1 | H-1 | Carboxyl | 8.2 | 102 | S-2 | Amide | 12.6 | −21 | 100:70 | OK | 20.2 | 232 |
| 2 | H-1 | Carboxyl | 8.2 | 102 | S-3 | Amide | 18.6 | −12 | 100:70 | OK | 24.2 | 213 |
| 3 | H-1 | Carboxyl | 8.2 | 102 | S-4 | Amide | 24.4 | −4 | 100:70 | OK | 31.9 | 55 |
| 4 | H-1 | Carboxyl | 8.2 | 102 | S-5 | Amide | 30.1 | 1 | 100:70 | OK | 35.9 | 32 |
| 5 | H-1 | Carboxyl | 8.2 | 102 | S-6 | Amide | 35.7 | 7 | 100:70 | OK | 37.2 | 20 |
| CE2 | H-1 | Carboxyl | 8.2 | 102 | S-3 | Amide | 18.6 | −12 | 100:30 | OK | 21.6 | 6 |
| 6 | H-1 | Carboxyl | 8.2 | 102 | S-3 | Amide | 18.6 | −12 | 100:50 | OK | 36.3 | 35 |
| 7 | H-1 | Carboxyl | 8.2 | 102 | S-3 | Amide | 18.6 | −12 | 100:70 | OK | 24.2 | 213 |
| 8 | H-1 | Carboxyl | 8.2 | 102 | S-3 | Amide | 18.6 | −12 | 100:100 | OK | 10.7 | 272 |
| CE3 | H-1 | Carboxyl | 8.2 | 102 | S-3 | Amide | 18.6 | −12 | 100:120 | OK | 7.3 | 351 |
| CE4 | H-1 | Carboxyl | 8.2 | 102 | S-7 | Amide | 13.3 | 30 | 100:70 | OK | 41.3 | 13 |
| 9 | H-1 | Carboxyl | 8.2 | 102 | S-8 | Amide | 14.1 | 11 | 100:70 | OK | 42.5 | 70 |
| 10 | H-1 | Carboxyl | 8.2 | 102 | S-9 | Amide | 18.8 | −8 | 100:70 | OK | 27.4 | 80 |
| 11 | H-1 | Carboxyl | 8.2 | 102 | S-10 | Amide | 18.0 | −8 | 100:70 | OK | 22.6 | 243 |
| 12 | H-1 | Carboxyl | 8.2 | 102 | S-11 | Amide | 24.5 | 1 | 100:70 | OK | 32.1 | 41 |
| 13 | H-1 | Carboxyl | 8.2 | 102 | S-12 | Amide | 20.0 | 1 | 100:70 | OK | 27.1 | 57 |
| 14 | H-1 | Carboxyl | 8.2 | 102 | S-13 | Amide | 18.1 | −14 | 100:70 | OK | 21.3 | 229 |
| 15 | H-2 | Carboxyl | 7.7 | 110 | S-3 | Amide | 18.6 | −12 | 100:70 | OK | 35.1 | 37 |
| 16 | H-3 | Carboxyl | 9.5 | 89 | S-3 | Amide | 18.6 | −12 | 100:50 | OK | 15.2 | 340 |
| 17 | H-4 | Carboxyl | 8.3 | 110 | S-3 | Amide | 18.6 | −12 | 100:70 | OK | 31.6 | 37 |
| 18 | H-5 | Carboxyl | 5.5 | 100 | S-3 | Amide | 18.6 | −12 | 100:70 | OK | 20.5 | 160 |

TABLE 3-continued

Preparation and Evaluation of Polymer Blends

| | | Hard (High Tg) Polymer | | | Soft (Low Tg) Polymer | | | Polymer | | Tensile | Tensile |
|---|---|---|---|---|---|---|---|---|---|---|---|
| Ex. | Polymer | Functional Group | Mole % | Tg (° C.) | Polymer | Functional Group | Mole % | Tg (° C.) | Ratio H:S | Compatibility | Strength (MPa) | Elongation (%) |
| 19 | H-6 | Carboxyl | 13.4 | 118 | S-3 | Amide | 18.6 | −12 | 100:70 | OK | 34.7 | 20 |
| CE5 | H-7 | Carboxyl | 8.4 | 48 | S-3 | Amide | 18.6 | −12 | 100:50 | OK | 7.2 | 286 |
| 20 | H-8 | Amide | 17.4 | 90 | S-14 | Carboxyl | 10.8 | −19 | 100:50 | OK | 20.8 | 143 |
| 21 | H-9 | Amide | 28.1 | 98 | S-14 | Carboxyl | 10.8 | −19 | 100:50 | OK | 24.9 | 186 |

Examples 22-30 and CE 6

The polymer solutions were mixed as described in Table 4. The clarity was checked to confirm compatibility. When a solution was recognized as clear, compatibility was judged as good. The polymer blend solution was coated onto 50 micrometer release polyester film with a knife coater. Then said coated layer was dried for 3 minutes at 95° C. and for 2 minutes at 155° C. After drying, a 50 micrometer clear acrylic film layer was obtained. The yield strength and elongation of said film were evaluated using Test Method 2. The results were described in Table 5 below.

A tacky polymer (BA:AA=96:4 with a Mw of 580,000, Tg of −50° C. at 42% Solids in EtAc/Toluene) was blended and mixed with Crosslinker 1 to form an adhesive compound. The ratio to tacky polymer to crosslinker was 100:0.2 by weight. The adhesive compound was coated with a knife coater onto a release liner with the structure as follows: Silicone release layer/Polyethylene film layer/Paper core layer/Polyethylene film layer. The coated layer was dried and cross-linked for 5 minutes at 90° C. After drying, a 30 μm adhesive layer was obtained. Then said acrylic adhesive was laminated with the film. The inkjet image quality and rework-ability of the Examples were evaluated. The results were described in Table 5 below.

Polymer Preparation and Evaluation

Preparation and Evaluation of Polymer Solutions H10-H14 and S15-S17 Polymers were prepared by solution polymerization using the monomers and ratios shown in The blends of polymer solutions were all found to have good compatibility. The functional group type, glass transition temperatures were calculated values by FOX law, and weight average molecular weights of the resulting polymers were determined as described above and are shown in Table 4 below.

Example 24

A pigment pre-mixture, which comprises H-1/TiO2 (available as TiPureR960, from DuPont)/methyl-isobutyl-ketone (MIBK)=10:50:40 by weight, was prepared. Said acrylic resin compound was mixed with the paint shaker (ARE250, provided by Thinky) for 10 minutes. The ratio of Hard Polymer1, Soft Polymer1 and the TiO2 was 100:100:50 by weight. The compatibility of said polymers and pigment was judged as "Good".

Said polymer solution was coated onto 50 μm release polyester film with a knife coater. Then said coated layer was dried and cross-linked for 3 minutes at 95 degree C. and for 2 minutes at 155° C. After drying, 50 μm acrylic film layer was obtained. Then said white film was laminated with same adhesive as Example 22.

Example 30

Example 30 as Example 22, but the adhesive was prepared with the addition of Crosslinker 2. The ratio of S15 and Crosslinker2 was 100:3 by weight having a crosslinker ratio of 9.

Examples 22-30 were heat-aged at 180° C. for 30 minutes. After that, film whitening and yellowing were not recognized.

TABLE 4

Preparation and Evaluation of Polymers

| Polymer | Composition (wt %) | Functional Group | Mw | Tg (° C.) | Solids (%) | Solvent |
|---|---|---|---|---|---|---|
| H-10 | MMA:BMA:MAA (48:46:6) | Carboxyl | 690,000 | 63 | 20 | MEK |
| H11 | MMA:BMA:MAA (48:46:6) | Carboxyl | 360,000 | 63 | 26 | MEK |
| H12 | MMA:BMA:MAA (48:46:6) | Carboxyl | 180,000 | 63 | 35 | MEK |
| H13 | MMA:BMA:MAA (48:46:6) | Carboxyl | 70,000 | 63 | 20 | MEK |
| H-14 | MMA:BMA:MAA (60:34:6) | Carboxyl | 120,000 | 72 | 40 | EtAc |
| S15 | BA:DMAA (85:15) | Amide | 360,000 | −40 | 30 | 70% EtAc: 30% MEK |
| S16 | BA:DAAM (70:30) | Amide | 360,000 | −26 | 30 | EtAc |
| S17 | BA:DMAA (90:10) | Amide | 580,000 | −45 | 30 | 70% EtAc: 30% MEK |
| Crosslinker 1 | Bisamide, (1,1'-isophtharoyl-bis(2-methyladiridine) | ** | ** | | 5 | Toluene |
| Crosslinker 2 | Epoxy, E-AX, made by Soken chemical | ** | ** | ** | 5 | Toluene |

TABLE 5

Preparation and Evaluation of Polymer Blends

| Ex. | Hard Polymer | Mw | Soft Polymer | Polymer Ratio H:S (w:w) | Inkjet Image Quality | Reworkability | Yield Point (N/25 mm) | Elongation (%) |
|---|---|---|---|---|---|---|---|---|
| 22 | H-10 | 690,000 | S-15 | 100:100 | Good | Good | 13 | 122 |
| 23 | H-10 | 690,000 | S-15 | 100:70 | Good | Good | 18 | 151 |
| 24 | H-10 | 690,000 | S-15 | 100:100 | Good | Good | 10 | 188 |
| 25 | H-11 | 360,000 | S-15 | 100:70 | Good | Good | 29 | 159 |
| 26 | H-12 | 180,000 | S-15 | 100:70 | Good | Good | 31 | 89 |
| 27 | H-10 | 690,000 | S-16 | 100:100 | Good | Good | 20 | 215 |
| 28 | H-10 | 690,000 | S-16 | 100:120 | Good | Good | 21 | 96 |
| 29 | H-10 | 690,000 | S-17 | 100:100 | Good | Good | 15 | 119 |
| 30 | H-14 | 120,000 | S-15 | 100:100 | Good | Good | 13 | 122 |
| CE6 | H-13 | 70,000 | S-15 | 100:70 | Poor | Poor | 21 | 31 |

Various modifications and alterations of the present invention will become apparent to those skilled in the art without departing from the spirit and scope of the invention.

What is claimed is:

1. A marking film comprising:
a film layer comprising a polymer blend of a first (meth)acrylic polymer having a glass transition temperature between about 30 degrees C. and about 180 degrees C. and a second (meth)acrylic polymer having a glass transition temperature higher than −80 degrees C. and less than 30 degrees C.; and
an adhesive layer,
wherein one of the first and second (meth)acrylic polymers comprises a carboxylic group and the other comprises at least one of N,N-dimethyl(meth)acrylamide, N,N-diethyl(meth)acrylamide, N-isopropyl(meth)acrylamide, N-octyl(meth)acrylamide, hydroxyethyl(meth)acrylamide, and diacetone(meth)acrylamide; and
wherein the first (meth)acrylic polymer and the second (meth)acrylic polymer are present in a mass ratio of less than or equal to 5:2 and greater than 1:1 and each of the first (meth)acrylic polymer and the second (meth)acrylic polymer have a weight average molecular weight of at least 100,000.

2. The marking film according to claim 1 wherein the first (meth)acrylic polymer comprises a carboxylic group and the second (meth)acrylic polymer comprises at least one of N,N-dimethyl(meth)acrylamide, N,N-diethyl(meth)acrylamide, N-isopropyl(meth)acrylamide, N-octyl(meth)acrylamide, hydroxyethyl(meth)acrylamide, and diacetone(meth)acrylamide.

3. The marking film according to claim 2 wherein
the glass transition temperature of the first (meth)acrylic polymer is between 50 degrees C. and 180 degrees C. and
the first (meth)acrylic polymer comprises 5 to 15 mol % of carboxylic group-containing monomer; and
the second (meth)acrylic polymer comprises 10 to 40 mol % of at least one of N,N-dimethyl(meth)acrylamide, N,N-diethyl(meth)acrylamide, N-isopropyl(meth)acrylamide, N-octyl(meth)acrylamide, hydroxyethyl(meth)acrylamide, and diacetone(meth)acrylamide.

4. The marking film according to claim 1 wherein
the first (meth)acrylic polymer comprises at least one of N,N-dimethyl(meth)acrylamide, N,N-diethyl(meth)acrylamide, N-isopropyl(meth)acrylamide, N-octyl(meth)acrylamide, hydroxyethyl(meth)acrylamide, and diacetone(meth)acrylamide; and
the second (meth)acrylic polymer comprises a carboxylic group.

5. The marking film according to claim 4 wherein the first (meth)acrylic polymer has a glass transition temperature that is between 50 degrees C. and 180 degrees C. and comprises 10 to 40 mol % of the at least one of N,N-dimethyl(meth)acrylamide, N,N-diethyl(meth)acrylamide, N-isopropyl(meth)acrylamide, N-octyl(meth)acrylamide, hydroxyethyl(meth)acrylamide, and diacetone(meth)acrylamide; and
the second (meth)acrylic polymer has a glass transition temperature of between 30 degrees C. and −80 degrees C. and comprises 5 to 15 mol % of carboxylic group-containing monomer.

6. The marking film according to claim 5 wherein the content of the first (meth)acrylic polymer is 100 mass parts and the content of the second (meth)acrylic polymer is 40 to 200 mass parts.

7. The marking film according to claim 1, wherein the adhesive layer comprises an adhesive polymer and:
a cross-linking agent.

8. The marking film according to claim 7, wherein the amount of the cross-linking agent is between about 0.02 parts to 2 parts by weight based on 100 parts by weight of the adhesive polymer.

9. The marking film according to claim 1, wherein the first (meth)acrylic polymer and the second (meth)acrylic polymer are present in a mass ratio of less than or equal to 5:2 and greater than or equal to 10:7.

10. The marking film according to claim 9, wherein the film layer has a tensile break strength of 10 MPa or more.

11. The marking film according to claim 9, wherein the film layer has a tensile break strength of 20 MPa or more.

12. The marking film according to claim 1, wherein the film layer has a tensile break strength of 10 MPa or more.

13. The marking film according to claim 1, wherein the film layer has a tensile break strength of 20 MPa or more.

* * * * *